(12) United States Patent  (10) Patent No.: US 6,485,222 B1
Ramsauer  (45) Date of Patent: Nov. 26, 2002

(54) CLAMPING BRACKET FASTENING FOR MOUNTING HINGES, LOCKS OR SIMILAR COMPONENTS ONTO A THIN WALL

(76) Inventor: Dieter Ramsauer, Am Neuhauskothen 20, D-42555 Velbert (DE)

( * ) Notice: Subject to any disclaimer, the term of this patent is extended or adjusted under 35 U.S.C. 154(b) by 0 days.

(21) Appl. No.: 09/744,580
(22) PCT Filed: Mar. 16, 2000
(86) PCT No.: PCT/EP00/02317
§ 371 (c)(1),
(2), (4) Date: Jan. 25, 2001
(87) PCT Pub. No.: WO00/73605
PCT Pub. Date: Dec. 7, 2000

(30) Foreign Application Priority Data

May 26, 1999 (DE) ..................... 299 09 182 U

(51) Int. Cl.[7] ................................. E05B 9/08
(52) U.S. Cl. ................ 403/374.3; 403/374.2; 403/108; 361/809
(58) Field of Search .......... 403/374.3, 374.2, 403/374.1, 373, 408.1, 108, 110; 361/809

(56) References Cited

U.S. PATENT DOCUMENTS 2,912,013 A  * 11/1959 Freyholdt et al. ....... 403/373 X
4,080,080 A    3/1978 Cisler
4,693,503 A    9/1987 Bisbing
5,016,141 A  *  5/1991 Lorig et al. ............. 403/373 X
5,381,308 A  *  1/1995 Wolpert et al. ............. 361/809
5,385,323 A    1/1995 Garelick

FOREIGN PATENT DOCUMENTS

DE  2 012 163  10/1971
DE  2 157 961   5/1973
DE  2 249 693   4/1974
DE  2 700 100   7/1978

* cited by examiner

Primary Examiner—Lynne H. Browne
Assistant Examiner—John R. Cottingham
(74) Attorney, Agent, or Firm—Reed Smith LLP

(57) ABSTRACT

The invention relates to a clamping clip fastening for mounting hinges, locks or the like structural component parts in a thin wall, such as a sheet metal cabinet door or sheet metal housing, projection proceeds from the structural component part to be fastened, penetrates an opening formed in the thin wall and is grasped by a clip that is supported on two oppositely located edge areas of the opening, wherein the clip is pulled in the direction of the projection by f a clamping screw. The part of the structural component penetrating the opening forms an offset on two oppositely located surfaces which are grasped by the clip, which offset receives the respective clip end and whose surface passes in the direction of the structural component part via an inclined surface into a surface contacting the interior face of the opening, which surface is approximately flush with the outer surface of the leg of the clip located in the offset.

13 Claims, 3 Drawing Sheets

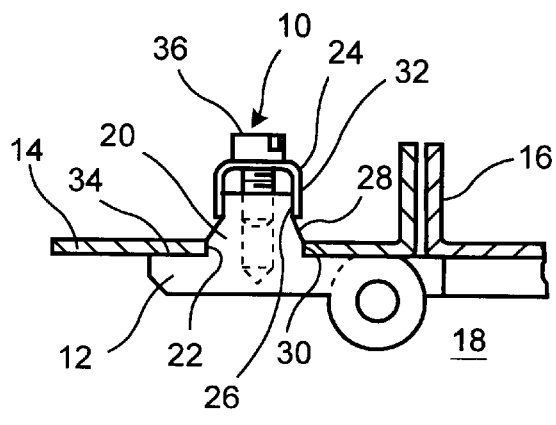
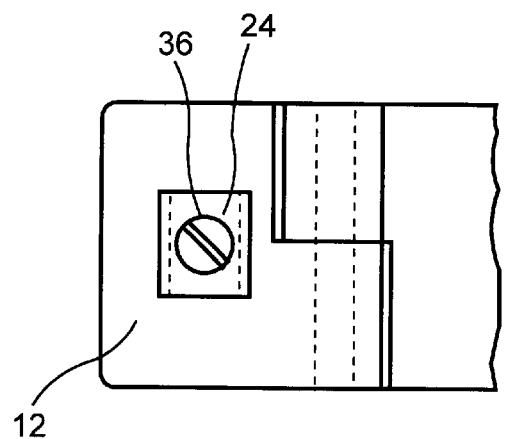
FIG. 1
FIG. 2
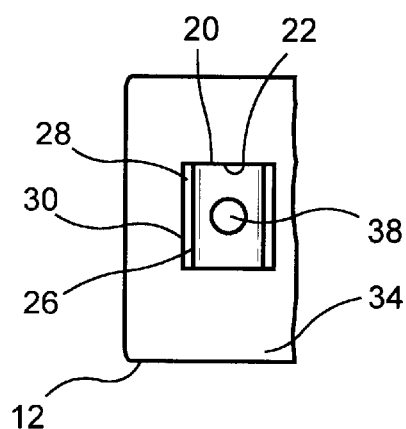
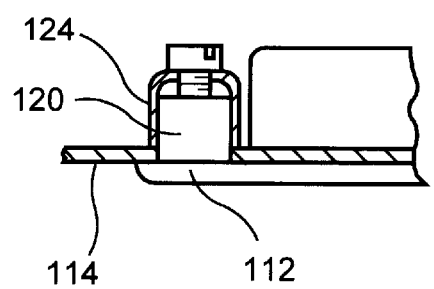
FIG. 3
FIG. 4
PRIOR ART
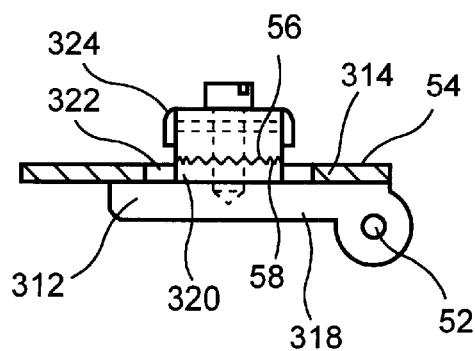
FIG. 5

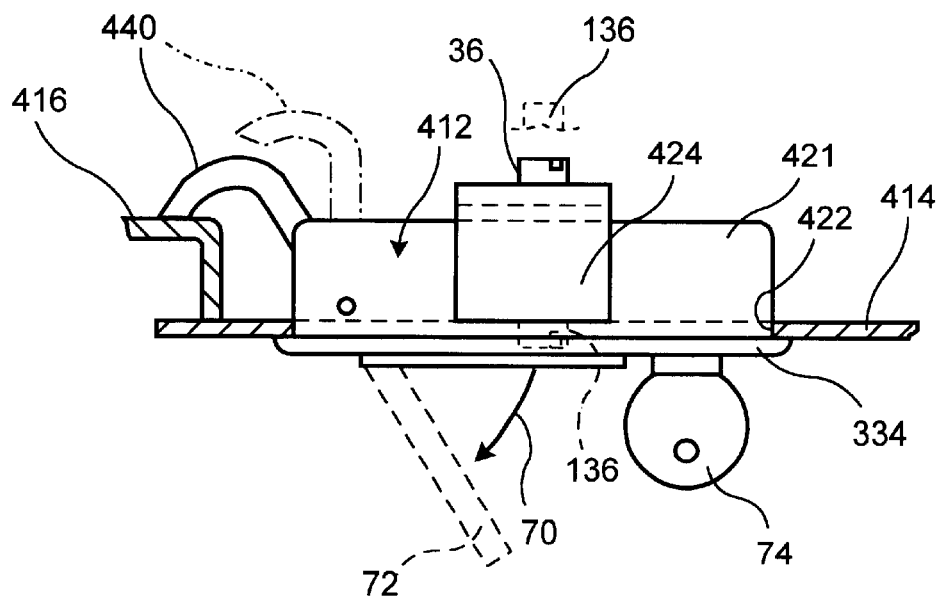
FIG. 11
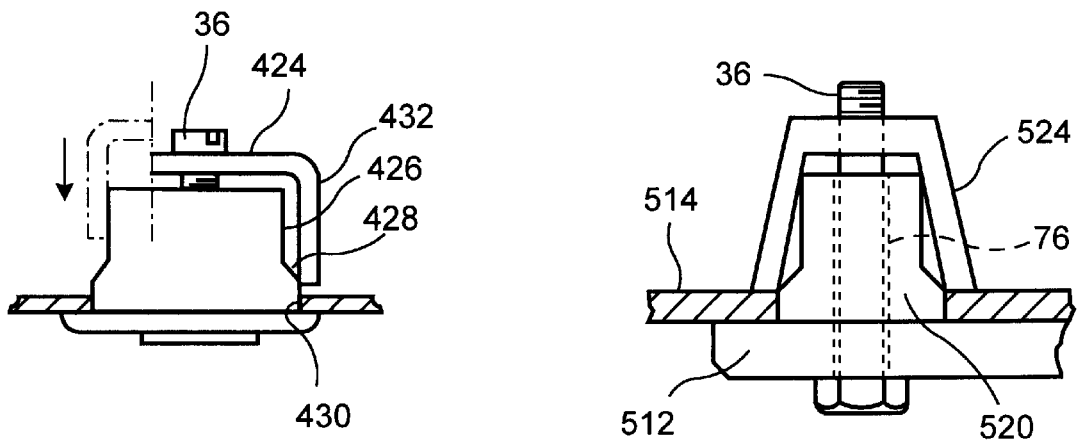
FIG. 12
FIG. 13
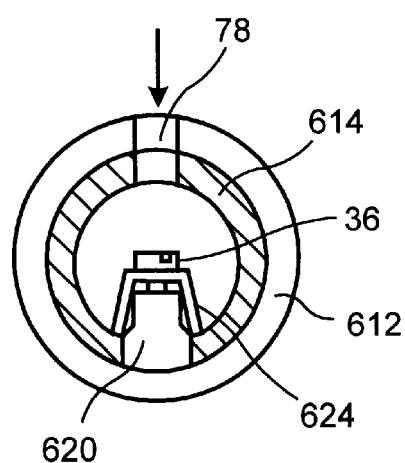
FIG. 14

CLAMPING BRACKET FASTENING FOR MOUNTING HINGES, LOCKS OR SIMILAR COMPONENTS ONTO A THIN WALL

BACKGROUND OF THE INVENTION

1. Field of the Invention

The invention is directed to a clamping clip fastening for mounting hinges, locks or the like structural component parts in a thin wall, such as a sheet metal cabinet door or housing, wherein a projection proceeds from the structural component part to be fastened, penetrates an opening formed in the thin wall and is grasped by a clip that is supported on two oppositely located edge areas of the opening, wherein the clip is pulled in the direction of the projection by means of a clamping screw.

2. Description of the Related Art

A clamping clip fastening of the type mentioned above is known, for example, from a brochure by Southco, Inc. entitled "Adjustable Lever Latch." Reference is also had to U.S. Pat. No. 4,693,503. This known clamping clip fastening is disadvantageous in that it requires relatively complicated handling and, in particular, does not allow blind mounting. Accordingly, the structural component part, e.g., an adjustable swivel lever lock such as that described in the cited brochure or U.S. patent, must first be pushed through a corresponding rectangular opening in a door leaf from one side by its projections comprising the essential locking parts until it contacts the outer surface of the door leaf by its flange edge, whereupon a mounting clip is pushed on to the penetrating projection of the lock from the inside of the door leaf until the mounting clip contacts the inner surface of the door leaf. A screw bolt is then inserted through an opening arranged in the web of the mounting clip and is screwed into a bore hole inside the projection of the lock, namely, until the clamping clip contacts the inner surface of the door leaf by the ends of its legs and the lock is pressed by its flange onto the outer surface of the door leaf and the latter is accordingly clamped in.

OBJECT AND SUMMARY OF THE INVENTION

It is the primary object of the invention to further develop the known clamping clip fastening in such a way that mounting is simplified and, in particular, blind mounting is also made possible.

This object is met in that the part of the structural component penetrating inward through the opening forms an offset on two oppositely located surfaces which are grasped by the legs of the clip, which offset receives the respective clip end and passes in the direction of the structural component part via an inclined surface into a surface contacting the interior face of the opening, which surface is approximately flush with the outer surface of the leg of the clip located in the offset.

This construction makes it possible to push the projection, including the pre-mounted clip, inward through the opening from the outside, after which the clamping screw need only be tightened, whereupon the legs of the clip are moved against the inner surface of the door leaf accompanied by a spreading through the inclined surfaces until the desired clamping contact results between the leg ends of the clamping clip on the inside of the door leaf on one side and the flange surface of the structural component part on the outside of the door leaf on the other side.

This type of mounting is much simpler than that in the prior art. Moreover, it makes possible a "blind" fastening of the structural component part, i.e., fastening without access to the rear side of a door leaf or housing or the like. In this case, however, the clamping screw must either be accessible from the front side so that it can be tightened, or tightening of the clamping screw from the rear or in some other way must be ensured by other steps (such as a suitable opening).

According to a further development of the invention, the surface of the clip leg contacting the interior face of the opening has an extension vertical to the wall plane which approximately corresponds to the thickness of the thin wall. This results in a particularly close fit between the structural component part and the opening.

For the same reason, it is advantageous when, according to another further development of the invention, the structural component part forms a flange surface contacting the outer surface of the thin wall, wherein the projection proceeds from this flange surface. The flange surface also makes it possible for the clamping forces to be carried off in a dependable manner and also allows a leaf seal to be used.

The projection of the structural component part can simply be a fastening projection provided specifically for this purpose; alternatively, the projection can also contain functional parts of a lock.

According to another further development of the invention, teeth or points proceed from the end faces of the clip legs and dig into the material of the inner surface of the thin wall. This can serve, for example, to ground a metal lock at the metal door leaf so as to eliminate risk to the user from dangerous voltage on the inside of the cabinet.

In the case of elongated structural component parts such as retractable swivel lever locks, it can be advantageous to provide clamping clip fastenings having two or more clips which are separate or connected in one piece by a web, wherein these clamping clip fastenings engage around the elongated housing at two or more locations and accordingly enable a more stable mounting.

According to another further development of the invention, the clip can be shaped like a cap which engages around the projection in such a way that two oppositely located side walls of the cap have teeth at their end faces such that these teeth lie on the edge area of the opening having a longer extension than the extension of the projection, wherein a mutual displacement between the clip or projection and the thin wall is not permitted by pressure contact, but is made possible when contact is loosened.

Adjustability should be made possible particularly with the fastening of hinge parts. This adjustability is limited to a determined direction, according to another further development of the invention, in that retaining walls are provided vertical to the side walls provided with points, which retaining walls prevent a displacement of the cap with respect to the projection in a direction transverse to its longer extension. With hinge parts, it is particularly advantageous, according to another embodiment form of the invention, when the structural component part is a hinge part and the displacement made possible by loosening contact extends parallel or vertical to the hinge pin.

In principle, the clamping screw can be arranged in two different ways. For one, the clip can have a through-hole in its web area and the structural component part can have a threaded bore hole for the clamping screw, in which case the clamping screw is tightened from the rear side of the door leaf. Alternatively, if the clip is provided with a threaded bore hole or the structural component part is provided with a through-hole for the clamping screw, the clamping screw is actuated from the front side of the door leaf, which is advantageous particularly with blind fastening.

If a structural component part is to be fastened to a pipe, the construction according to the invention can likewise be used, wherein the possibility of blind fastening is advantageous particularly in this case because the inside of the pipe is normally difficult to access. When an opening is provided in the pipe opposite to the projection axis, an arrangement in which the screw faces inward can even be clamped.

BRIEF DESCRIPTION OF THE DRAWINGS

The invention will be described more fully with reference to embodiment examples which are shown in the Figures.

FIG. 1 shows an axial view in partial section of a clamping clip fastening constructed according to the invention for mounting a hinge on a sheet metal cabinet;

FIG. 2 shows a rear (top) view of the arrangement according to FIG. 1;

FIG. 3 shows a view similar to that in FIG. 2, but with the fastening screw and clip removed;

FIG. 4 shows a clamping clip fastening according to the prior art;

FIG. 5 shows a view similar to that in FIG. 1 of an adjustable clamping clip fastening according to another embodiment form of the invention;

FIG. 11 shows a side view of a clamping clip fastening according to the invention in a lock arranged in a sheet metal cabinet;

FIG. 12 shows a view from the right of the lock according to FIG. 11;

FIG. 13 shows a clamping clip fastening for "blind" insertion and;

FIG. 14 shows a clamping clip fastening for use in a thin wall which is bent in a tubular shape.

DESCRIPTION OF THE PREFERRED EMBODIMENTS

Figure 6:
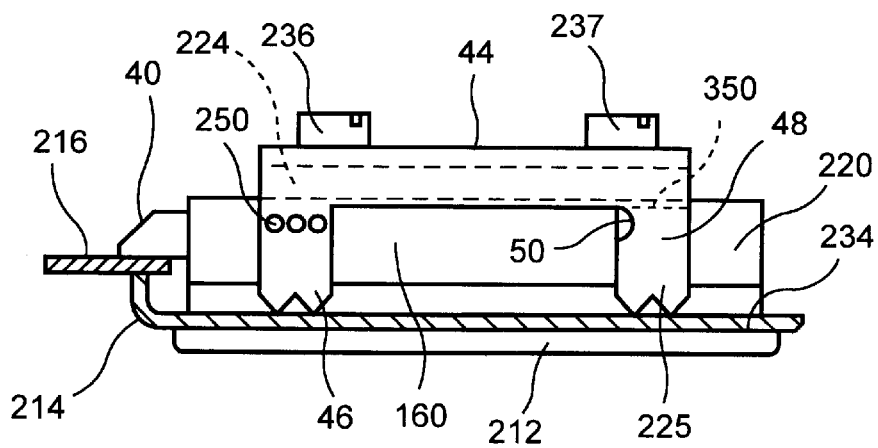
FIG. 6 shows a side view of a clamping clip fastening for mounting a lock.

FIG. 1 shows a clamping clip fastening 10 for mounting a hinge part 12 in a thin wall 14, wherein, in this case, the thin wall 14 is a door leaf, for example, which is fitted to a sheet metal cabinet or housing 16 by means of a hinge 18, part of which is formed by the hinge part 12. The structural component part 12, in this case, the hinge part 12, to be fastened to the door leaf 14 has a projection 20 which projects through an opening 22 which is formed in the thin wall 14 and which has a substantially rectangular cross section according to FIG. 3. The drawing also shows a clip 24 which is substantially U-shaped and engages around the projection 20 by its two U-legs.

The prismatic (noncircular) shape of the opening advantageously prevents the structural component part 12 from rotating in the opening 22, so that only one fastener is needed in principle.

The part 20 of the structural component part, in this case, the hinge part 12, penetrating the opening 22 forms an offset on two oppositely located surfaces 26 grasped by the clip, wherein this offset receives the respective end of the clip and passes in the direction of the structural component part 12, via an inclined surface 28, into a surface 30 which contacts the interior face of the opening 22 and which is approximately flush with the outer surface 32 of the leg of the clip 24 as long as the latter lies in the offset 26. The width of the surface of the projection 20 located inside the interior face of the opening 22 is approximately equal to the thickness of the thin wall 14, so that the inclination begins roughly at the point where the projection 20 emerges from the interior face of the opening 22. As can further be seen, the structural component part 12, in this case, in the form of a hinge part, forms a flange surface 34 which contacts the outer surface of the thin wall 14 and from which the projection 20 proceeds. By means of a clamping screw 36, it is possible to displace the clip 14 in the direction of the projection 20, during which movement the ends of the legs of the clip 20 slide out from the offset surface on the inclined surface, wherein the two legs are bent apart until, finally, the end faces of the two legs of the clip 24 strike two oppositely located edge areas of the opening and the clip 24 can be supported at this location. In so doing, the structural component part 12 is pressed against the outer surface of the door leaf or thin wall 14 by its flange surface 34 and is accordingly secured at this wall.

Due to the fact that the legs of the clip 24 are initially received in offset areas of the sides of the projection 20 in such a way that the outer surfaces of the clip legs do not extend beyond the surface of the projection 20 contacting the interior face of the opening, the projection, including the clip and screw, can be pushed through the opening 20 from the outside. Only when the clamping screw 36 is tightened is the distance between the two ends of the clip legs great enough that it rests on the edges of the opening and accordingly prevents the arrangement from falling out of the opening.

In the prior art shown in FIG. 4, this mounting from the outside, including the clip 124 shown in FIG. 4, is impossible; rather, in the prior art, the structural component part 112, along with the clip 124 which is not mounted, must initially be pushed through a corresponding opening in a thin wall 114 from the outside, after which the clip 124 can be fitted from the inside and a clamping screw 36 is inserted through a bore hole in the web of the clamping clip 124 and can be screwed into a threaded bore hole in the projection 120. An arrangement of this kind does not allow the clip to be pre-mounted on the shoulder or projection by means of the clamping screw and also does not allow blind mounting, if required, as will be explained more fully in the following.

In a top view (from the rear) according to FIG. 1, FIG. 3 shows the flange surface 34 of the hinge part 12, from which the projection 20 proceeds, with its side surfaces 30 and 26 connecting with each other through an inclined surface 28. A threaded bore hole 38, into which a head screw 36 can be screwed, as was already described, and, in so doing, engages the clip shown in FIG. 2 by its head, serves to receive the clamping screw 36.

In the embodiment forms according to FIGS. 1 to 3, the projection is provided only for fastening purposes. However, the projection can also contain functional parts of a lock as is shown, for example, in FIGS. 6 to 8. Accordingly, the structural component part 212 in this case comprises an escutcheon with a flange surface 234 and a shoulder 220 which extends through a corresponding opening in the door leaf 214 and which may be a lock case from which a latch 40 emerges which is placed behind the rear surface of a housing 216 or the like and thus closes an opening formed in the housing 216 by means of a flap or door 214. In this case, the projection 220, or lock case 220, is grasped by a plurality of clips, in this case two, 224, 225 which are supported (see FIG. 7 showing a view from the left-hand side of the arrangement according to FIG. 6) on oppositely located edge areas 242, 243 by their end faces. Openings arranged in the web area of the U-shaped clip are also provided in this case, wherein clamping screws 236, 237 (two of them, in this case) are guided through the openings and are received in corresponding threaded bore holes in the projection 220 forming the lock case. Due to the fact that the two clips 224, 225 are connected with one another through a web connection 44, the arrangement as a whole has greater stability and mounting is simplified. A unitary clip which is U-shaped in cross section and engages along the full length of the two longitudinal walls of the projection 220 could also be used. However, due to the fact that the cutout 150 is punched out, resulting in two short clips 224, 225 which are connected with one another by the residual web, less pressing force is required to press the clip legs apart, especially when the selected material thickness is larger so as to lend greater stability to the teeth 46.

Figure 7:
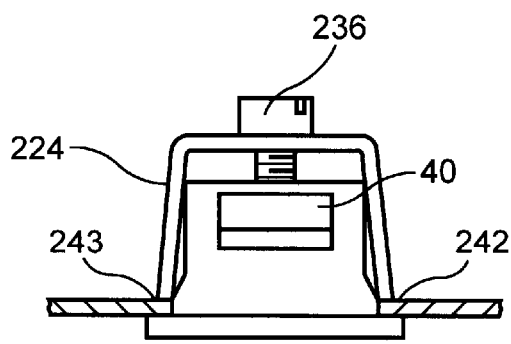
FIG. 7 shows a view from the left of the lock according to FIG. 6.

The points or teeth 46 shown in the embodiment form according to FIG. 6 proceed from the end faces of the clip legs and dig into the material of the thin wall 214—possibly penetrating through an insulating coat of lacquer or the like—and, for example, when the thin wall is made of sheet metal, produce an electrical connection between this sheet metal and the metal clip 224, which electrical connection may, in turn, by way of the screw connection 236, produce an electrical connection to the lock case 220 which is also produced from metal. An actuating key communicating with the lock case 22 could therefore not be exposed to dangerous electrical potential diverging from the potential in the cabinet even when a loose, live wire inside the switching cabinet contacts the metal lock case 220, for example.

Figure 8:
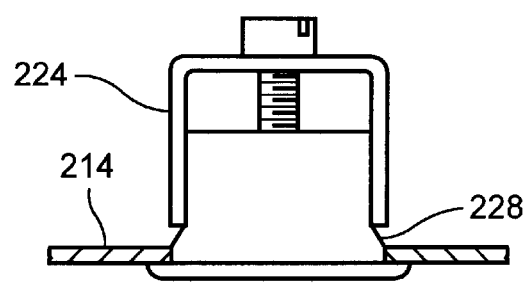
FIG. 8 shows a view from the right of the lock prior to clamping.

When the legs of the two clips 224, 225 move out of their pre-mounted position shown in FIG. 8 in which it is possible to push the entire arrangement through the opening in the door leaf 214 into the clamped position shown in FIG. 7 by which the end faces of the clip 224 were pressed outward along the inclined surface 228, a fastening and grounding of the lock are therefore achieved simultaneously.

If the material of the clip 224 is relatively thick and, therefore, especially rigid, which can be important for heavy embodiment forms and for the grounding contact, it is advantageous that the base areas 48 of the legs of the U-shaped clips are deliberately weakened near the web, for example, by means of a notch 50 or perforations 150 or a bending line 350, in order to facilitate bending at this location.

Figure 9:
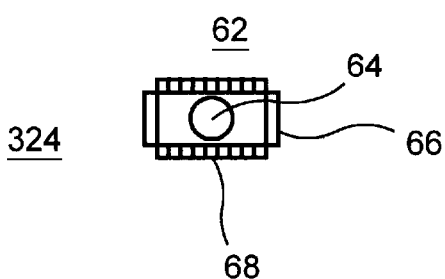
FIG. 9 shows a clamping clip which is adjustable by means of teeth.
Figure 10:
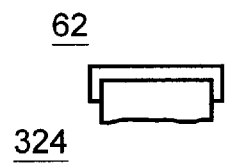
FIG. 10 shows a side view of the structural component part according to FIG. 9.

There are cases of application in which the exact position of the fastening point of the structural component part 312, as in FIG. 5, for example, should be adjustable, e.g., for purposes of adjusting the distance between the door leaf 14 and the frame 16 by means of the hinge 318. This can be achieved in that the opening 322 in the door leaf 314 has an extension vertical to the pin 52 of the hinge which is greater than that of the shoulder 320. In this case, the U-shaped clip extends parallel to the direction of the pin 52, its end faces accordingly being seated on the edges of the opening directly adjoining the projection 320, and therefore holds the structural component part 312 at a determined distance from the pin 52 relative to the door leaf or the like 314. According to FIG. 9, the end faces of a plate-like metal stamping 62 form a toothing which sits on a projection 58 formed by the structural component part 312 and encloses the latter in the manner of a cap, wherein the fastening screw 336 can be guided through a corresponding opening 64 in the cap part. Side walls 66 prevent a movement of the cap transverse to the direction of these side walls, while the side walls 68 which are provided with the teeth 56 prevent a movement transverse to their direction. The toothing itself serves as a locking stop on the inner surface 54 of the door leaf 314 similar to the toothing at 46 in FIG. 6. At the same time, this fastening also achieves a grounding, if required.

FIG. 11 shows a side view of a swivel lever lock 412 which was inserted through a corresponding opening in a door leaf 414 by its lock body until contacting a flange 434. By means of a clip 424 which spreads outward when tightening the clamping screw 436 according to FIG. 12, the housing of the lock 421 is held in this opening of the door leaf 414. In the locked position, a tongue part 440 grasps a folded frame 416 and accordingly holds the door leaf 414 in the closed position at this frame 416. To open the door 414, the swivel lever of the swivel lever lock is swiveled outward, see arrow 70, so that the tongue 440 releases the frame area of the frame 416. The swivel lever 72 can be locked in the swiveled in position; a cylinder lock in the lock casing 421 which can be operated by a key 74 could be used for this purpose, for example.

In the embodiment forms described above, access was had to the clamping screw from the rear. In the embodiment form shown in FIG. 13, this is modified in that the clamping clip 524 is provided with a threaded bore hole, while the structural component part 512 and the projection 520 proceeding from the structural component part 512 have a through-hole 76 which extends up to the outer surface of the structural component part 512 and accordingly enables access to the head of the screw 36. In this construction, an entirely blind mounting can be carried out in that the structural component part 512 is first inserted by its projection 520 and the offset clip 524, including pre-mounted bolt 36, into a corresponding through-opening in the door leaf or wall 512, whereupon the screw can be tightened and clamping is carried out by the spreading of the clip 524 in the manner described above.

A blind mounting of the type mentioned above is particularly useful with thin walls whose rear side is not accessible, e.g., walls which are bent to form a pipe as is shown in a cross-sectional view in FIG. 14. In this case, an annular structural component part 612, for example, is held on a thin wall 614 that is bent to form a pipe by means of a projection 620 projecting through an opening in the bore hole wall, wherein a clamping screw 36 places the clip 624 against the inner edge surfaces of the tubular thin wall 614. As in FIG. 13, the head of the screw 36 can be accessible from the outer side or, as in the present case, access can be gained through a small bore hole 76 which is arranged opposite to it in the tubular structure and through which, e.g., a screwdriver could be inserted.

Blind mounting is also advantageous in small cabinets because, when mounting with the locking door on top, these cabinets are placed on the base. Blind mounting of the hinges and/or locks of the outer surface of the door facing upward is particularly convenient. Conversely, opening (i.e., lifting) the door for obtaining access to the inner surface of the door would be particularly inconvenient. The latter is obviated by blind mounting.

A head of the clamping screw which faces outward after blind mounting of the lock can be arranged for security reasons in such a way that it is not visible or accessible when the lock is secured. For example, the swivel lever 72 of the lock shown in FIG. 11 could cover the head of an oppositely (blind-) mounted screw 136.

The invention is commercially applicable, e.g., in switching cabinet construction.

While the foregoing description and drawings represent the present invention, it will be obvious to those skilled in the art that various changes may be made therein without departing from the true spirit and scope of the present invention.

What is claimed is:

1. A clamping clip fastening for mounting hinges, locks or structural component parts in a thin wall, a sheet metal cabinet door or housing, comprising:

a structural component part to be fastened, said structural component having a projection which penetrates an opening formed in the thin wall;

a clip for grasping the projection, said clip being supported on two oppositely located edge areas of the opening;

a clamping screw for pulling said clip in the direction of the projection; and a part of the structural component penetrating the opening forming an offset on two oppositely located surfaces which are grasped by the clip, which offset receives an end of the respective clip and whose surface passes in the direction of the structural component part via an inclined surface into a surface contacting an interior face of the opening, which surface is approximately flush with the outer surface of the leg of the clip located in the offset;

wherein the projection contains functional parts of a lock.

2. The clamping clip fastening according to claim 1, wherein the surface of the projection contacting the interior face of the opening has an extension vertical to the plane which approximately corresponds to the thickness of the thin wall.

3. The clamping clip fastening according to claim 1, wherein the structural component part forms a flange surface which contacts the outer surface of the thin wall, wherein the projection projects from this flange surface.

4. The clamping clip fastening according to claim 1, wherein teeth or points proceed from the end faces of the clip legs and dig into the material of the thin wall.

5. The clamping clip fastening according claim 1, wherein two or more clips are connected in one piece by a web, wherein these clips engage around the elongated housing of a swivel lever lock.

6. A clamping clip fastening for mounting hinges, locks or structural component parts in a thin wall, a sheet metal cabinet door or housing, comprising:

a structural component part to be fastened, said structural component having a projection which penetrates an opening formed in the thin wall;

a clip for grasping the projection, said clip being supported on two oppositely located edge areas of the opening;

a clamping screw for pulling said clip in the direction of the projection; and a part of the structural component penetrating the opening forming an offset on two oppositely located surfaces which are grasped by the clip, which offset receives an end of the respective clip and whose surface passes in the direction of the structural component part via an inclined surface into a surface contacting an interior face of the opening, which surface is approximately flush with the outer surface of the leg of the clip located in the offset;

wherein the clip has the shape of a cap which engages around the projection in such a way that two oppositely located side walls of the cap have teeth at their end faces such that these teeth lie on the edge area of the opening having a longer extension than the extension of the projection, wherein a mutual displacement between the clip or projection and the thin wall is not permitted by pressure contact, but is made possible when contact is loosened;

wherein retaining walls are provided vertical to the side walls provided with points, which retaining walls prevent a displacement of the cap with respect to the projection in a direction transverse to their extension.

7. The clamping clip fastening according to claim 6, wherein the structural component part is a hinge part and the displacement made possible by loosening contact extends parallel or vertical to the hinge part.

8. The clamping clip fastening according to claim 7, wherein the structural component part is a hinge, one of whose parts is provided with a shoulder with the possibility of displacement parallel to the hinge pin and whose other part is provided with the possibility of displacement vertical thereto.

9. The clamping clip fastening according to claim 1, wherein the clip has a threaded bore hole and the structural component part has a through-hole for the clamping screw.

10. A clamping clip fastening for mounting hinges, locks or structural component parts in a thin wall, a sheet metal cabinet door or housing, comprising:

a structural component part to be fastened, said structural component having a projection which penetrates an opening formed in the thin wall;

a clip for grasping the projection, said clip being supported on two oppositely located edge areas of the opening;

a clamping screw for pulling said clip in the direction of the projection; and a part of the structural component penetrating the opening forming an offset on two oppositely located surfaces which are grasped by the clip, which offset receives an end of the respective clip and whose surface passes in the direction of the structural component part via an inclined surface into a surface contacting an interior face of the opening, which surface is approximately flush with the outer surface of the leg of the clip located in the offset;

wherein the thin wall is a pipe wall;

wherein the pipe wall has an opening or slot located opposite from the clamping fastener enabling a tool to access the clamping screw.

11. A clamping clip fastening for mounting hinges, locks or structural component parts in a thin wall, a sheet metal cabinet door or housing, comprising:

a structural component part to be fastened, said structural component having a projection which penetrates an opening formed in the thin wall;

a clip for grasping the projection, said clip being supported on two oppositely located edge areas of the opening;

a clamping screw for pulling said clip in the direction of the projection; and a part of the structural component penetrating the opening forming an offset on two oppositely located surfaces which are grasped by the clip, which offset receives an end of the respective clip and whose surface passes in the direction of the structural component part via an inclined surface into a surface contacting an interior face of the opening, which surface is approximately flush with the outer surface of the leg of the clip located in the offset;

wherein the clip has a through-hole in a web area and the structural component part has a threaded bore hole for the clamping screw;

wherein the structural component part is a lock, and in that the actuating head for the clamping screw is covered when the lock is closed.

12. The clamping clip fastening of claim 11 wherein the lock is a lever lock.

13. The clamping clip fastening according to claim 1, wherein the clip has a through-hole in a web area and the structural component part has a threaded bore hole for the clamping screw.

* * * * *